US011802064B2

(12) United States Patent
Wu et al.

(10) Patent No.: US 11,802,064 B2
(45) Date of Patent: Oct. 31, 2023

(54) CAPACITIVE DEIONIZATION DESALINATION DEVICE

(71) Applicants: Tsinghua University, Beijing (CN); HON HAI PRECISION INDUSTRY CO., LTD., New Taipei (TW)

(72) Inventors: Yang Wu, Beijing (CN); Shuai Liang, Beijing (CN); Xia Huang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 435 days.

(21) Appl. No.: 17/205,103

(22) Filed: Mar. 18, 2021

(65) Prior Publication Data

US 2021/0363033 A1 Nov. 25, 2021

(30) Foreign Application Priority Data

May 22, 2020 (CN) .......................... 202010443769.6

(51) Int. Cl.
*B01D 61/18* (2006.01)
*B01D 61/20* (2006.01)
(Continued)

(52) U.S. Cl.
CPC ............ *C02F 1/4691* (2013.01); *C02F 1/444* (2013.01); *C02F 1/46109* (2013.01);
(Continued)

(58) Field of Classification Search
CPC ........ C02F 1/46109; C02F 2001/46133; C02F 2201/46
See application file for complete search history.

(56) References Cited

U.S. PATENT DOCUMENTS 10,737,941 B2  8/2020  Zhang et al.
10,854,394 B2  12/2020  Yu et al.
2020/0106085 A1*  4/2020  Liu ....................... H01M 4/665

FOREIGN PATENT DOCUMENTS

CN  106044967  10/2016
CN  110660591  1/2020
(Continued)

OTHER PUBLICATIONS

Nadakatti, Suresh, Mahesh Tendulkar, and Manoj Kadam. "Use of mesoporous conductive carbon black to enhance performance of activated carbon electrodes in capacitive deionization technology." Desalination 268.1-3 (2011): 182-188. (Year: 2011).*
(Continued)

*Primary Examiner* — Bradley R Spies
(74) *Attorney, Agent, or Firm* — ScienBiziP, P.C.

(57) ABSTRACT

A capacitive deionization desalination device is provided. The capacitive deionization desalination device includes a mesh spacer and two carbon nanotube composite electrodes. The mesh spacer is located between the two carbon nanotube composite electrodes. Each carbon nanotube composite electrode includes at least one carbon nanotube film structure and a composite carbon layer, and the carbon nanotube film structure includes at least two carbon nanotube films, and the composite carbon layer includes activated carbon and carbon black, and the composite carbon layer is located on the carbon nanotube film structure.

13 Claims, 16 Drawing Sheets

(51) Int. Cl.
    *C02F 1/461*     (2023.01)
    *C02F 1/469*     (2023.01)
    *C02F 1/44*     (2023.01)
    *B01D 61/14*     (2006.01)

(52) U.S. Cl.
    CPC ............ *B01D 61/14* (2013.01); *B01D 61/145* (2013.01); *B01D 61/18* (2013.01); *B01D 61/20* (2013.01); *B01D 2311/2684* (2013.01); *C02F 2001/46133* (2013.01); *C02F 2001/46152* (2013.01); *C02F 2201/46* (2013.01); *C02F 2201/46105* (2013.01)

(56) References Cited

FOREIGN PATENT DOCUMENTS

| | | |
|---|---|---|
| TW | 201934496 | 9/2019 |
| TW | 202009063 | 3/2020 |

OTHER PUBLICATIONS

Liang, Peng, et al. "Optimized desalination performance of high voltage flow-electrode capacitive deionization by adding carbon black in flow-electrode." Desalination 420 (2017): 63-69. (Year: 2017).*

Xie, Jiangzhou, et al. "Carbon nanotubes in-situ cross-linking the activated carbon electrode for high-performance capacitive deionization." Separation and Purification Technology 239 (2020): 116593. (Year: 2020).*

* cited by examiner

CAPACITIVE DEIONIZATION DESALINATION DEVICE

CROSS-REFERENCE TO RELATED APPLICATIONS

This application claims all benefits under 35 U.S.C. § 119 from the Chinese Patent Application No. 202010443769.6, filed on May 22, 2020, in the China Intellectual Property Office, the disclosure of which is incorporated herein by reference.

FIELD

The subject matter herein generally relates to a capacitive deionization desalination device.

BACKGROUND

To meet the growing global water demand for life and production, effective strategies and water treatment technologies are in urgent need. The rapid advances in fields such as wastewater reclamation and seawater desalination bring promising prospects in solving water shortage crisis. Though most developed cities and towns have built complete centralized water treatment facilities, water problems in many remote and underdeveloped areas are less focused. Furthermore, conventional centralized treatment processes are not suitable for areas where stable drainage and continuous wastewater treatment are not provided. Therefore, developing highly efficient decentralized water treatment technologies are highly desirable.

Membrane separation technology has achieved tremendous development in practical applications owing to reliable permeate quality and small footprint. However, the membrane fouling problem and high energy consumption issue have reduced its sustainability in engineering applications. Electrofiltration method has been widely recognized as efficient and sustainable in mitigating membrane fouling. Capacitive deionization (CDI) has been widely reported to be more efficient than reverse osmosis in desalinating low-salinity water. In order to develop effective water treatment technologies, a capacitive deionization desalination system combining the ultrafiltration method and the capacitive deionization technology has been developed. However, electrodes widely used for electrosorption are mainly made of activated carbon. And the poor electrode performance seriously affects the development of the capacitive deionization desalination system.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views. Implementations of the present technology will be described, by way of example only, with reference to the attached figures.

DETAILED DESCRIPTION

Figure 1:
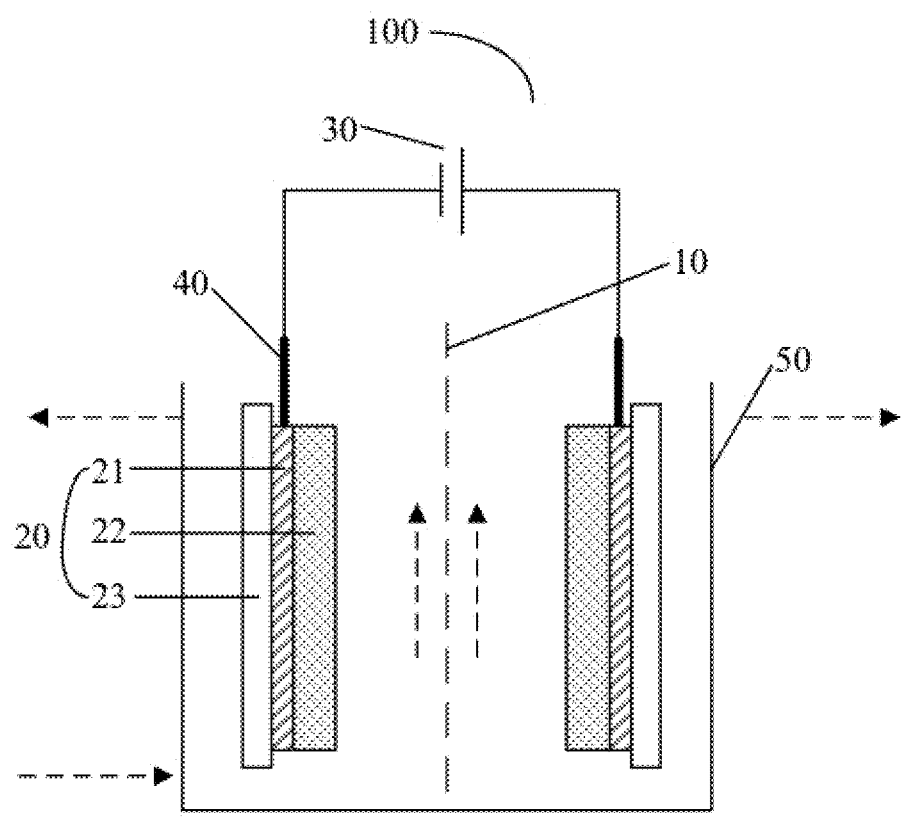
FIG. 1 is a schematic view of one embodiment of a capacitive deionization desalination device.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "substantially" is defined to be essentially conforming to the particular dimension, shape, or other feature that the term modifies, such that the component need not be exact. The term "comprising" means "including, but not necessarily limited to"; it specifically indicates open-ended inclusion or membership in a so-described combination, group, series, and the like. It should be noted that references to "an" or "one" embodiment in this disclosure are not necessarily to the same embodiment, and such references mean "at least one".

Referring to FIG. 1, a capacitive deionization desalination device 100 of one embodiment is provided. The capacitive deionization desalination device 100 includes a mesh spacer 10 and two carbon nanotube composite electrodes 20. The mesh spacer 10 is located between the two carbon nanotube composite electrodes 20. The two carbon nanotube composite electrodes 20 are connected to an external power source 30. One of the two carbon nanotube composite electrodes 20 is used as a positive electrode, the other one of the two carbon nanotube composite electrodes 20 is used as a negative electrode. Each carbon nanotube composite electrode 20 is spaced apart from the mesh spacer 10. Each carbon nanotube composite electrode 20 includes at least one carbon nanotube film structure 21 and a composite carbon layer 22. The composite carbon layer 22 defines a first surface and a second surface corresponding to the first surface. The composite carbon layer 22 is located on at least one surface of the carbon nanotube film structure 21. The carbon nanotube film structure 21 and the composite carbon layer 22 are stacked with each other.

The mesh spacer 10 is located between the two carbon nanotube composite electrodes 20. The mesh spacer 10 is used to prevent short circuits between the two carbon nanotube composite electrodes 20. The mesh spacer 10 is a porous network structure. The mesh spacer 10 is a layered structure.

The two carbon nanotube composite electrodes 20 are parallel and spaced apart with each other. A separation distance between the two carbon nanotube composite electrodes 20 is in a range of 1 micrometer to 10 micrometers. In one embodiment, the separation distance is 1.5 micrometers. The composite carbon layer 22 in each carbon nanotube composite electrode 20 is closer to the mesh spacer 10 than the carbon nanotube film structure 21 in each carbon nanotube composite electrode 20. Since the carbon nanotube composite electrode 20 is a planar structure and can allow water molecules to pass through the planar structure, the effective working area of the carbon nanotube composite electrode 20 can be determined according to the planar area of the carbon nanotube composite electrode 20.

The carbon nanotube composite electrode 20 further includes a substrate 23. The substrate 23 is configured to support the carbon nanotube film structure 21 and the composite carbon layer 22. The carbon nanotube film structure 21 and the composite carbon layer 22 are placed on a surface of the substrate 23. In one embodiment, the substrate 23, the carbon nanotube film structure 21, and the composite carbon layer 22 are stacked with each other, and carbon nanotube film structure 21 is located between the substrate 23 and the composite carbon layer 22. The substrate 23 can be a flexible substrate. In one embodiment, a material of the substrate 23 is polyethylene terephthalate.

The carbon nanotube film structure 21 can be a free-standing structure. The term "free-standing structure" includes the carbon nanotube film structure 21 that can sustain the weight of itself when it is hoisted by a portion thereof without any significant damage to its structural integrity. Therefore, when the carbon nanotube film structure 21 is a free-standing structure, the substrate 23 is an optional structure. The carbon nanotube film structure 21 includes a plurality of carbon nanotubes. The plurality of carbon nanotubes along an extending direction join end to end by van der Waals attraction forces. The plurality of carbon nanotubes can be single-walled carbon nanotubes, double-walled carbon nanotubes, or multi-walled carbon nanotubes. The length and diameter of the plurality of carbon nanotubes can be selected according to need. A diameter of the single-walled carbon nanotubes can be from about 0.5 nanometers to about 10 nanometers. A diameter of the double-walled carbon nanotubes can be from about 1.0 nanometer to about 15 nanometers. A diameter of the multi-walled carbon nanotubes can be from about 1.5 nanometers to about 50 nanometers.

Figure 2:
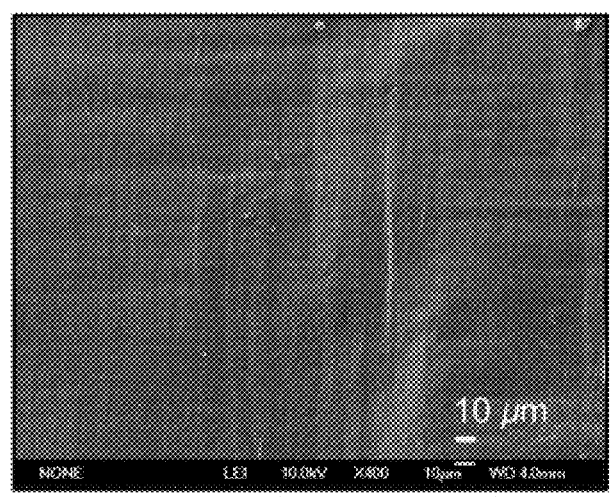
FIG. 2 is a Scanning Electron Microscope (SEM) image of a carbon nanotube film.
Figure 3:
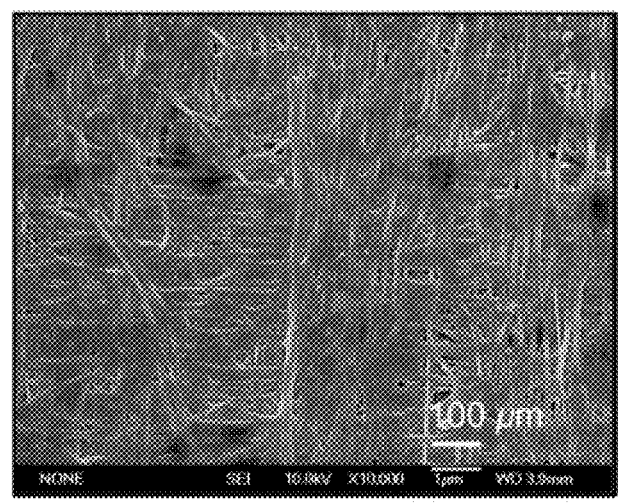
FIG. 3 is an enlarged SEM image of the carbon nanotube film.

The carbon nanotube film structure 21 includes at least two carbon nanotube films stacked and intersected to form a plurality of holes. The carbon nanotube film includes a plurality of carbon nanotube wires. Each carbon nanotube wire extends through two opposite sides of the carbon nanotube film and includes a plurality of carbon nanotubes. The plurality of carbon nanotube wires are parallel to each other and arranged at intervals. Referring to FIG. 2 and FIG. 3, the carbon nanotube film structure 21 includes a plurality of carbon nanotube wires crossed together to form a carbon nanotube net having a plurality of holes. The plurality of holes extend throughout the carbon nanotube film structure 21 along the thickness direction of the carbon nanotube film structure 21. At the same time, the plurality of holes can ensure water molecules pass through the carbon nanotube film structure 21. The plurality of carbon nanotube wires are obtained by treating a drawn carbon nanotube film with an organic solvent. The organic solvent can be a volatile organic solvent, such as ethanol, methanol, acetone, dichloroethane or chloroform.

Figure 4:
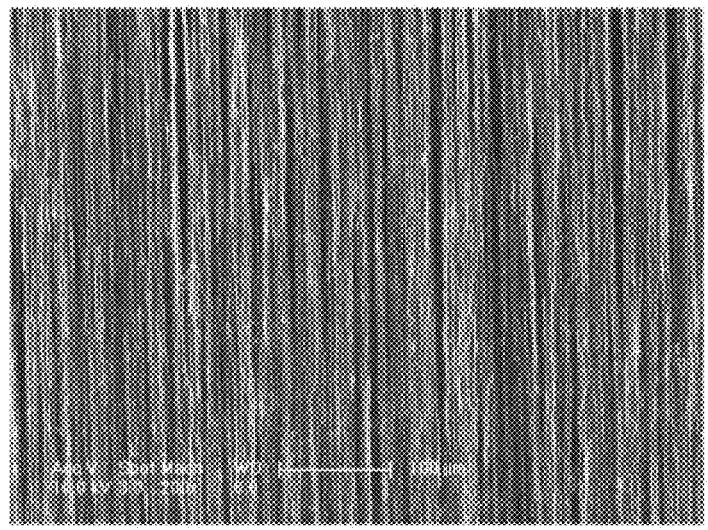
FIG. 4 is an SEM image of a drawn carbon nanotube film.

Referring to FIG. 4, in one exemplary embodiment, the drawn carbon nanotube film can be drawn from a carbon nanotube array that is able to have a film drawn therefrom. The drawn carbon nanotube film includes a plurality of successively oriented carbon nanotube segments joined end-to-end by van der Waals attraction forces therebetween. Each carbon nanotube segment includes a plurality of carbon nanotubes parallel to each other, and combined by van der Waals attraction forces therebetween. The carbon nanotubes in the drawn carbon nanotube film are oriented along a preferred orientation. The drawn carbon nanotube film can be treated with an organic solvent to increase the mechanical strength and toughness and reduce the coefficient of friction of the drawn carbon nanotube film. A thickness of the drawn carbon nanotube film can range from about 0.5 nanometers to about 100 micrometers. The drawn carbon nanotube film defines a plurality of holes between adjacent carbon nanotubes.

In one embodiment, the carbon nanotube film structure 21 includes at least two stacked drawn carbon nanotube films. In other exemplary embodiments, the carbon nanotube film structure 21 can include two or more coplanar carbon nanotube films, and can include layers of coplanar carbon nanotube films. Additionally, when the carbon nanotubes in the carbon nanotube film are aligned along one preferred orientation (e.g., the drawn carbon nanotube film), an angle can exist between the orientation of carbon nanotubes in adjacent films, whether stacked or adjacent. Adjacent carbon nanotube films can be combined by only the van der Waals attraction forces therebetween. In one embodiment, an angle between the aligned directions of the carbon nanotubes in two adjacent carbon nanotube films can range from about 0 degrees to about 90 degrees. When the angle between the aligned directions of the carbon nanotubes in adjacent stacked drawn carbon nanotube films is larger than 0 degrees, a plurality of holes is defined by the carbon nanotube film structure 21. In one exemplary embodiment, the carbon nanotube film structure 21 is shown with the aligned directions of the carbon nanotubes between adjacent stacked drawn carbon nanotube films at 90 degrees. Stacking the carbon nanotube films will also add to the structural integrity of the carbon nanotube film structure 21.

Figure 5A:
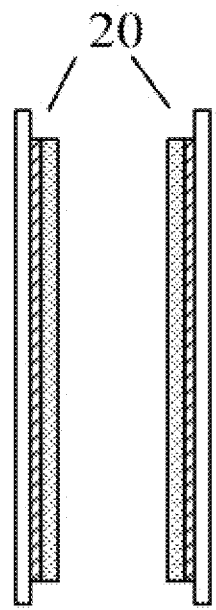
FIG. 5*a* is a schematic view of a flat carbon nanotube composite electrode.
Figure 5B:
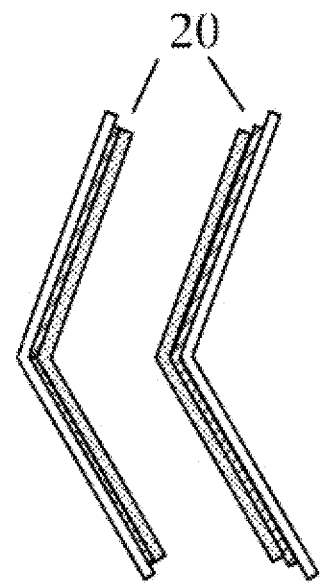
FIG. 5*b* is a schematic view of a folded carbon nanotube composite electrode.
Figure 5C:
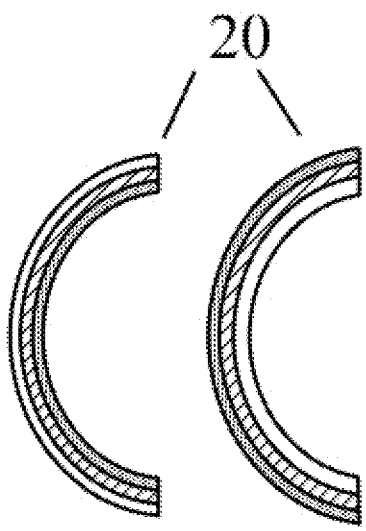
FIG. 5*c* is a schematic view of a curved carbon nanotube composite electrode.

The composite carbon layer 22 includes an activated carbon and a carbon black. The composite carbon layer 22 further includes a binder for bonding and fixing particles. The binder can be polyvinylidene fluoride or N-methyl-2-pyrrolidone. The mass ratio of the activated carbon particles, carbon black particles, and the binder in the composite carbon layer 22 can be selected as required to ensure that the composite carbon layer 22 has good conductivity. In one embodiment, a method of making the composite carbon layer 22 includes: mixing and stirring activated carbon, carbon black and polyvinylidene fluoride, N-methyl-2-pyrrolidone for 24 hours to obtain a mixture; applying the mixture to the surface of the carbon nanotube film structure 21; drying the mixture at 50 degrees Celsius for one hour and then placing the mixture at 4 degrees Celsius in the deionized water. Since the carbon nanotube film structure 21 is composed of carbon nanotube films and the carbon nanotube film is flexible and bendable, the carbon nanotube film structure 21 is also flexible and bendable. When the composite carbon layer 22 is applied on the carbon nanotube film structure 21 to form the carbon nanotube composite electrode 20, the carbon nanotube composite electrode 20 is a flexible and bendable structure. Referring to FIG. 5a-5c, the carbon nanotube composite electrode 20 can be a flat electrode, a folded electrode or a curved electrode, as long as the two carbon nanotube composite electrodes 20 can be parallel to each other.

Figure 6:
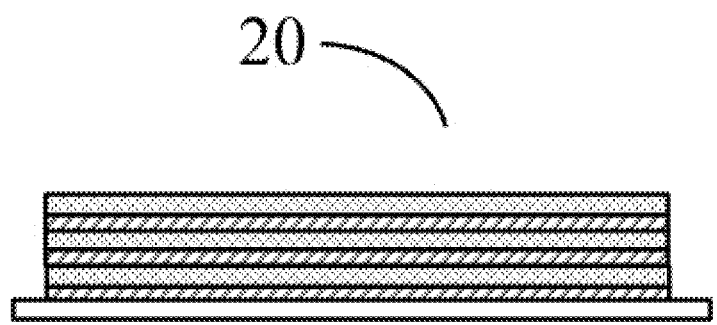
FIG. 6 is a schematic view of one embodiment of a carbon nanotube composite electrode.

The carbon nanotube film structure 21 defines two opposite surfaces. In one embodiment, the composite carbon layer 22 is located on one surface of the carbon nanotube film structure 21 and covers the entire surface of the carbon nanotube film structure 21. In one embodiment, the composite carbon layer 22 is located on both surfaces of the carbon nanotube film structure 21. In one embodiment, the carbon nanotube film structure 21 comprises two carbon nanotube films, and the composite carbon layer 22 can be located between the two carbon nanotube films. In one embodiment, the carbon nanotube composite electrode 20 further includes a plurality of carbon nanotube film structures 21 and a plurality of composite carbon layers 22. Referring to FIG. 6, the plurality of carbon nanotube film structures 21 and the plurality of composite carbon layers 22 are stacked and arranged at intervals.

The external power source 30 can be DC power source, such as a chemical fuel cell, a biofuel cell, or a physical energy battery. In one embodiment, the external power source 30 is an electrochemical workstation, the electrochemical workstation is configured to control voltage.

The capacitive deionization desalination device 100 further includes two current collectors 40. Each current collector 40 is electrically connected to a carbon nanotube composite electrode 20. The current collector 40 is configured to connect the carbon nanotube composite electrode 20 to the positive or negative electrode of the external power source 30. A material of the current collector 40 is conductive material. In one embodiment, the current collector 40 is a titanium conductor coated with platinum metal.

The capacitive deionization desalination device 100 further includes a sealing frame 50 for sealing the capacitive deionization desalination device 100 to prevent liquid overflow during operation. In one embodiment, the sealing frame 50 is a silicone rubber frame.

A working principle of the capacitive deionization desalination device 100 includes: inputting the water to be treated into the capacitive deionization desalination device 100 through a water inlet by using a peristaltic pump, wherein a cross-flow chamber is formed between the two carbon nanotube composite electrodes 20, and the water to be treated is inputted into the cross-flow chamber, and the water inlet rate is 1.4 mL/min; energizing the two carbon nanotube composite electrodes 20, wherein the water to be treated is driven through the two carbon nanotube composite electrodes 20 under the action of the voltage and flows out from the two carbon nanotube composite electrodes 20.

Figure 7A:
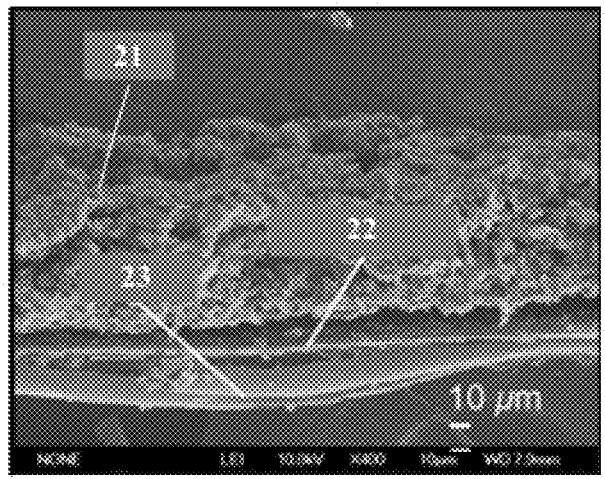
FIG. 7*a* is an SEM image of a carbon nanotube composite electrode.
Figure 7B:
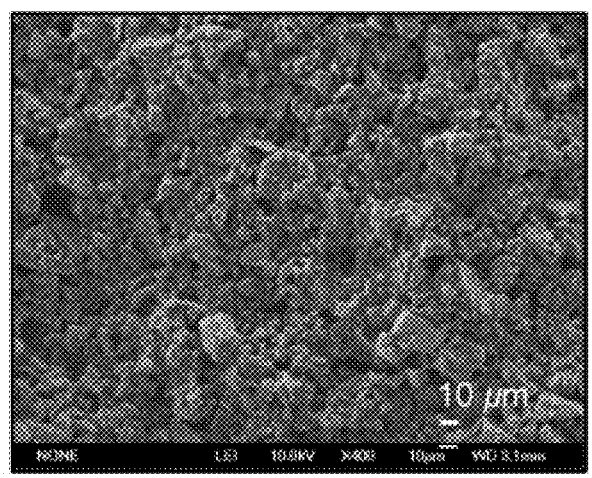
FIG. 7*b* is an SEM image of a contrast electrode.
Figure 8A:
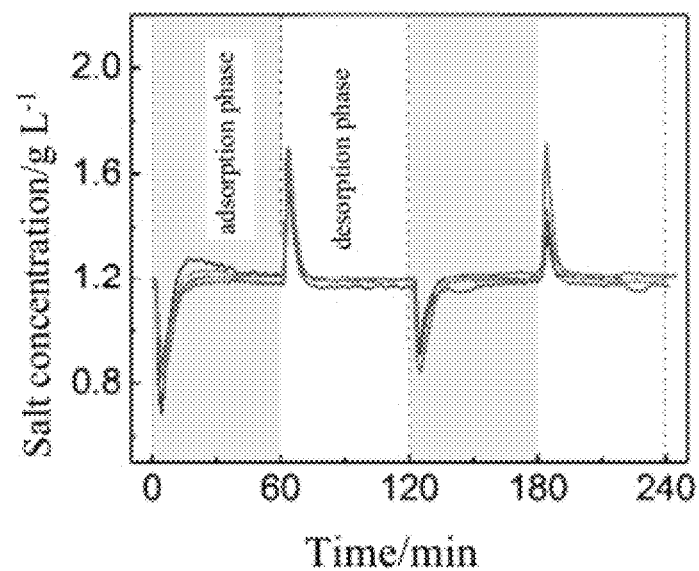
FIG. 8*a* is curves of the salt concentration flowing out from the contrast electrode under different applied voltages.
Figure 8B:
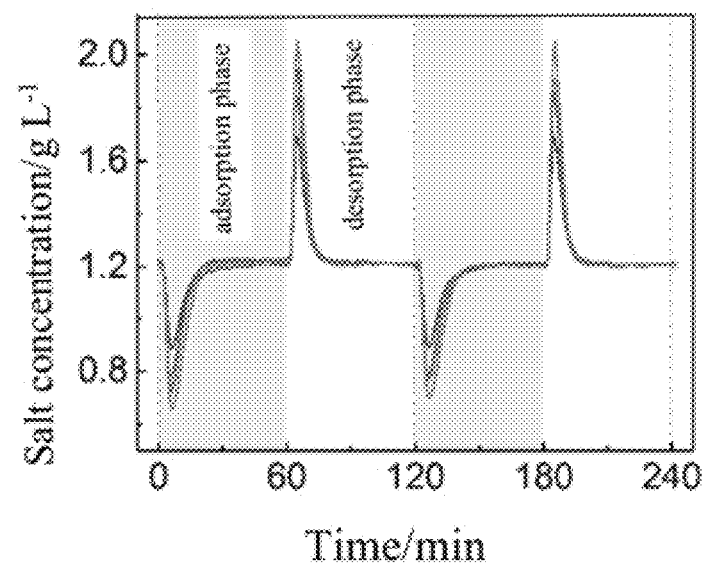
FIG. 8*b* is diagrams of the salt concentration flowing out from the carbon nanotube composite electrode under different applied voltages.
Figure 9A:
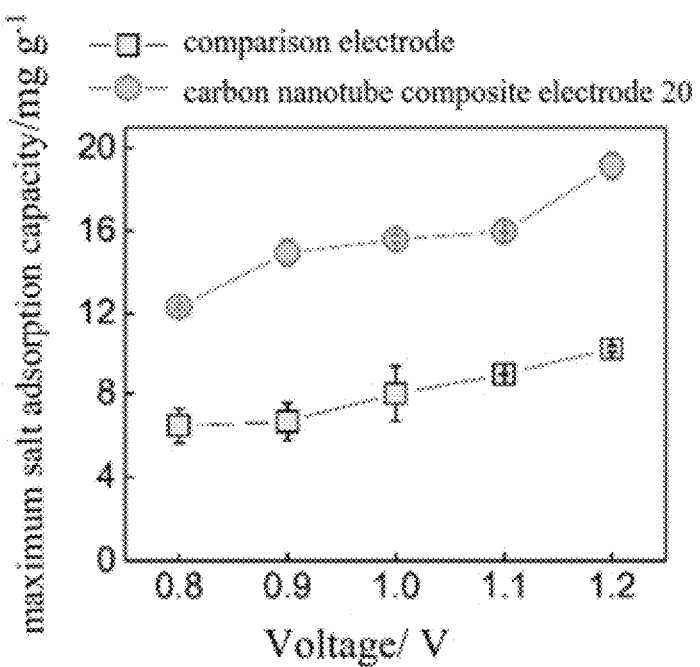
FIG. 9*a* is diagrams of the maximum salt adsorption capacity of the contrast electrode and the carbon nanotube composite electrode under different voltages.
Figure 9B:
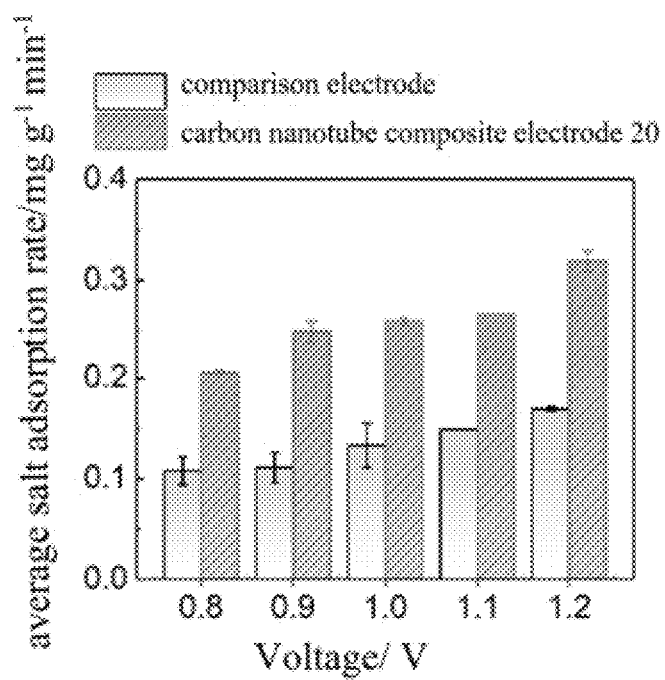
FIG. 9*b* is diagrams of the average rate of salt adsorption of the contrast electrode and the carbon nanotube composite electrode under different voltages.
Figure 10:
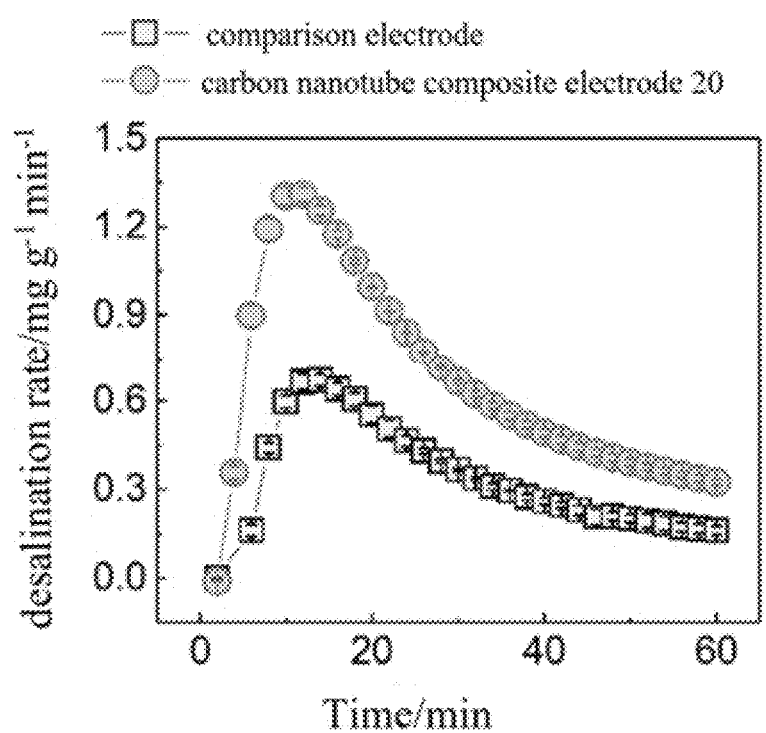
FIG. 10 is diagrams of the desalination rate of the carbon nanotube composite electrode and the contrast electrode with a voltage of 1.2 V under different times.

In order to illustrate the desalination performance of the carbon nanotube composite electrode 20 in the capacitive deionization desalination device 100, a comparison electrode is used for comparison tests. A material of the comparison electrode is the same to the material of the composite carbon layer 22, and the comparison electrode and the carbon nanotube composite electrode 20 have substantially the same weight. Referring to FIG. 7a, the microscopic morphology of the carbon nanotube composite electrode 20 is a three-layer structure formed by a substrate, a carbon nanotube film structure, and a composite carbon layer. FIG. 7b shows the microscopic morphology of the comparison electrode. The desalination performance of the electrode can be reflected by testing the CDI performance of the electrode. The CDI performance parameters include maximum salt adsorption capacity (mSAC), average salt adsorption rate (ASAR) and charging efficiency (A). In order to test the CDI performance of the carbon nanotube composite electrode 20 and the comparison electrode, five groups of different voltage values were applied to two different types of electrodes to perform periodic desalination experiments. The five groups of different voltage values are 0.8V, 0.9V, 1.0V, 1.1V, 1.2V. Each period includes an adsorption phase an a desorption phase, and the duration of each phase is 60 minutes. The water to be treated used in this experiment is a potassium chloride solution with a concentration of 1 g/L. FIG. 8a shows the curve of the salt concentration flowing out of the comparison electrode under different applied voltages. FIG. 8b shows the curve of the salt concentration flowing out of the carbon nanotube composite electrode 20 under different applied voltages. It can be seen from the FIG. 8a and FIG. 8b, the concentration change trends of the two electrodes are similar, but the curve of the carbon nanotube composite electrode 20 is smoother than the comparison electrode, which indicates that the desalination process of the carbon nanotube composite electrode 20 is more stable than the comparison electrode. Since the carbon nanotube film structure 21 of the carbon nanotube composite electrode 20 can promote the universal connection of the composite carbon layer 22, the stability of the carbon nanotube composite electrode 20 in an aqueous environment is improved. At the same time, the amplitude of the absorption peak and the analytical peak of the carbon nanotube composite electrode 20 is larger than that of the comparative electrode, which indicates that the carbon nanotube composite electrode 20 has a higher desalination ability. Referring to FIG. 9a and FIG. 9b, the comparison electrode is an activated carbon electrode, and the carbon nanotube composite electrode 20 is a composite electrode of super-aligned carbon nanotubes and activated carbon. FIG. 9a shows the curves of the maximum salt adsorption capacity of the comparison electrode and the carbon nanotube composite electrode under different voltages. FIG. 9b shows the curves of the average salt adsorption rate of the comparison electrode and the carbon nanotube composite electrode under different voltages. Both the maximum salt adsorption capacity and the average salt adsorption rate of the carbon nanotube composite electrode 20 are about twice as high as those of the comparison electrode under the same voltage, which indicates that the carbon nanotube composite electrode 20 has superior adsorption performance than the comparison electrode. Since the ultra-high specific surface area and abundant internal space of the carbon nanotube film structure 21 provide a large number of adsorption sites, which greatly improves the adsorption capacity. FIG. 10 shows the curves of the desalination rate of the carbon nanotube composite electrode 20 and the comparison electrode at different times when the applied voltage is 1.2V. The desalination rate of the carbon nanotube composite electrode 20 is significantly higher than that of the comparison electrode.

Figure 11:
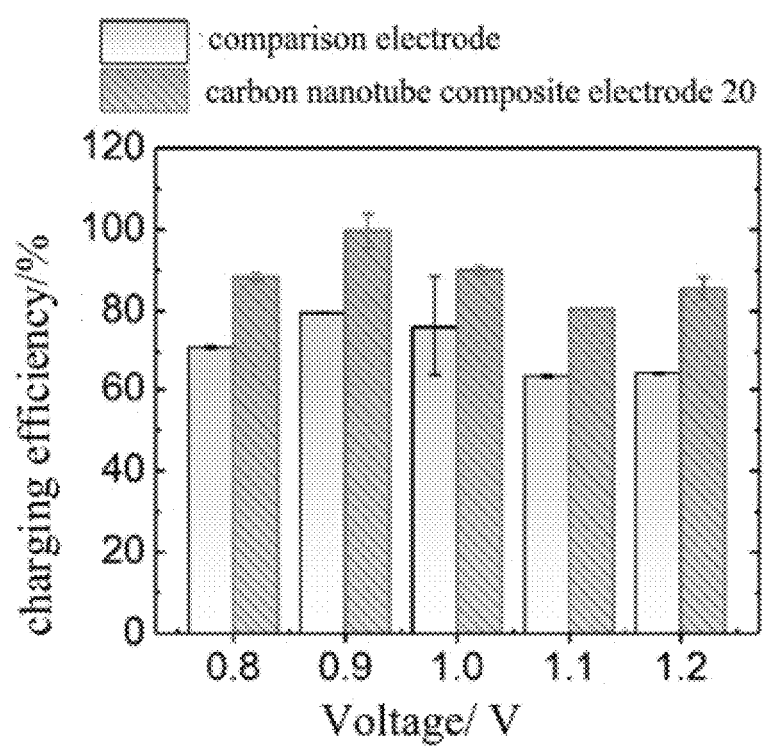
FIG. 11 is a charging efficiency diagram of the carbon nanotube composite electrode and the contrast electrode under different applied voltages.

FIG. 11 shows the charging efficiency of the carbon nanotube composite electrode 20 and the comparison electrode under different applied voltages. The charging efficiency of the carbon nanotube composite electrode 20 is increased by 26% compared with the charging efficiency of the comparison electrode, which indicates that the internal consumption of current can be reduced by introducing the carbon nanotube film. Since the carbon nanotube film of the carbon nanotube film structure 21 is arranged in an orderly manner, it can act as a conductive chain and can promote the connection of the composite carbon layer 22 and reduce the internal resistance of the carbon nanotube composite electrode 20.

Figure 12:
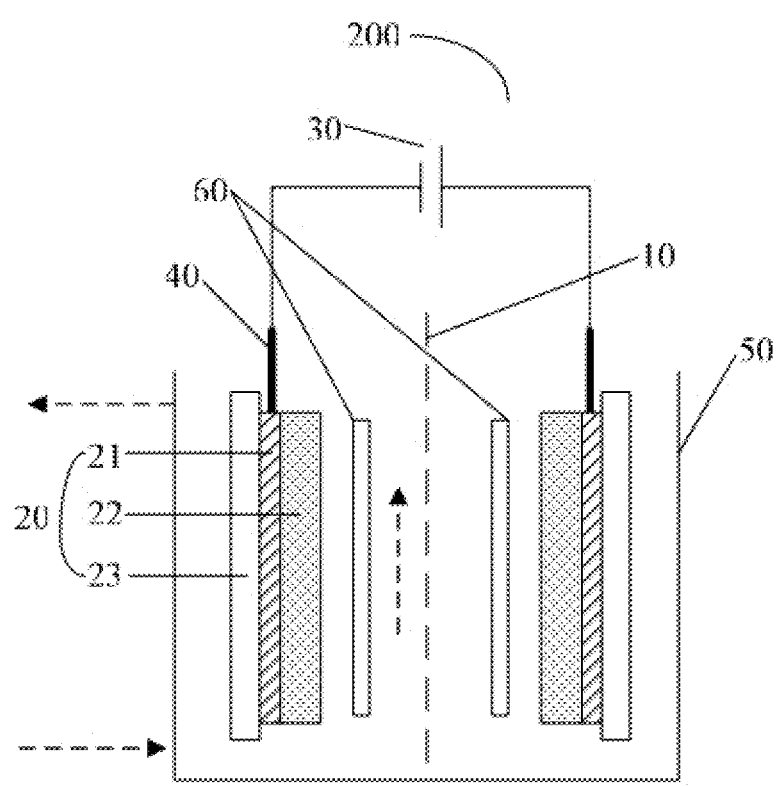
FIG. 12 is a schematic view of another embodiment of a capacitive deionization desalination device.

Referring to FIG. 12, a capacitive deionization desalination device 200 of one embodiment is provided. The capacitive deionization desalination device 200 includes a mesh spacer 10, two ultrafiltration membranes 60 and two carbon nanotube composite electrodes 20. The two carbon nanotube composite electrodes 20 are connected to an external power source 30. One of the two carbon nanotube composite electrodes 20 is connected to the positive electrode of the external power source 30, and the other one of the two carbon nanotube composite electrodes 20 is connected to the negative electrode of the external power source 30. The two ultrafiltration membranes 60 are located between the two carbon nanotube composite electrodes 20. The mesh spacer 10 is located between the two ultrafiltration membranes 60. Each ultrafiltration membrane 60 is spaced apart from the mesh spacer 10. Each carbon nanotube composite electrode 20 includes a carbon nanotube film structure 21 and a composite carbon layer 22. The composite carbon layer 22 is located on at least one surface of the carbon nanotube film structure 21. The carbon nanotube film structure 21 and the composite carbon layer 22 are stacked with each other.

The capacitive deionization desalination device 200 includes two ultrafiltration membranes 60. The ultrafiltration membrane 60 is used to trap organic particles in water.

The ultrafiltration membrane 60 can be organic polymer membranes or inorganic membranes. The material of the ultrafiltration membrane 60 can be polyvinylidene fluoride, polytetrafluoroethylene, polysulfone, polyethersulfone, cellulose acetate, polyvinyl chloride, polyacrylonitrile, ceramic membrane and metal membrane. In one embodiment, the material of the ultrafiltration membrane 60 is polyvinylidene fluoride membrane. The polyvinylidene fluoride membrane is made by a non-solvent induced phase separation method, and the method includes: dissolving 15 g of polyvinylidene fluoride and 1 g of polyvinylpyrrolidone in 84 g of N,N-dimethylformamide to prepare a casting solution; annealing the casting solution at 50 degrees Celsius for one hour and degassing for 12 hours; coating the casting solution on a glass plate with a thickness of 250 microns by using a coating machine; then placing the glass plate in a deionized water bath to form the polyvinylidene fluoride membrane.

Other characteristics of the capacitive deionization desalination device 200 are the same as the capacitive deionization desalination device 100 discussed above.

The working principle of the capacitive deionization desalination device 200 includes: inputting the water to be treated into the capacitive deionization desalination device 200 through a water inlet by using a peristaltic pump, wherein a cross-flow chamber is formed between the two carbon nanotube composite electrodes 20, and the water to be treated is inputted into the cross-flow chamber; energizing the two carbon nanotube composite electrodes 20, wherein the water to be treated passes through one ultrafiltration membrane 60 and one carbon nanotube composite electrode 20 connected to the cathode, and a water outlet on the anode side is closed. Then in the next period, the power direction is reversed, and the water outlet on the anode side can open to allow water to flow out.

Figure 13:
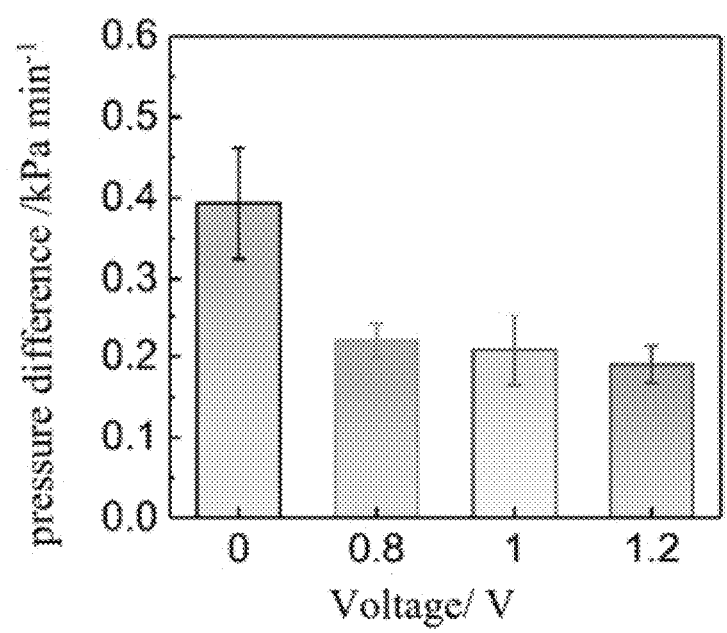
FIG. 13 is a diagram of TMP value of ultrafiltration membrane under different voltage values.
Figure 14:
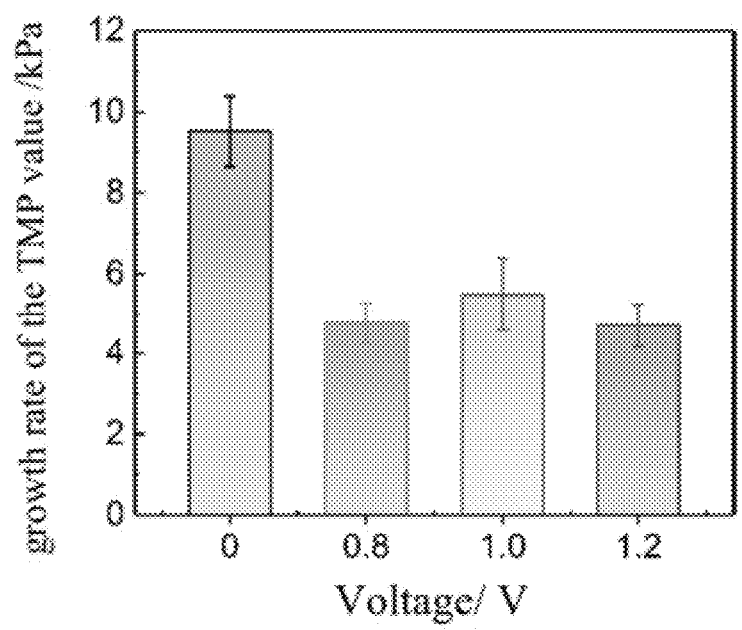
FIG. 14 is a diagram of the growth rate of the TMP value of ultrafiltration membrane under different voltage values.

In order to further illustrate the water purification performance of the carbon nanotube composite electrode 20 in the capacitive deionization desalination device 200, a comparison electrode without an ultrafiltration membrane is used for comparison test. The water purification performance of an electrode can be reflected by testing the CUF performance of the electrode, and the CUF performance can be characterized by scaling inhibition, scaling retention, and desalination. In order to test the CUF performance of the carbon nanotube composite electrode 20 and the comparison electrode, three groups of different voltage values were applied to two different types of electrodes to perform periodic desalination experiments. The three groups of different voltage values are 0.8V, 1.0V, 1.2V. In addition, there is also a group of no voltage. Each period includes a purification phase and a discharge phase, and the duration of each phase is 15 minutes. In one embodiment, the water to be treated includes 5 mg/L bovine serum albumin, 10 mg/L humic acid, 20 mg/L sodium alginate and 1 g/L potassium chloride. Here, the bovine serum albumin, humic acid, and sodium alginate are used as organic particles in water. In each purification phase, the water to be treated is driven through the ultrafiltration membrane 60 and the carbon nanotube composite electrode 20 at a speed of 2 mL/min to form purified effluent. In each discharge phase, the peristaltic pump is turned off within the first ten minutes to desorb the adsorbed salt and depressurize deposited dirt, the adsorbed salt and the deposited dirt are discharged in the next five minutes. In addition, a pressure sensor is used to record the pressure difference (TMP) between the influent and the transmembrane effluent to indicate the contamination of the membrane. And the total organic carbon (TOC) in the water is measured to calculate the average dirt retention rate. Referring to FIG. 13, FIG. 13 shows the curves of the TMP value of the ultrafiltration membrane 60 in the capacitive deionization desalination device 200 under different voltage values. The TMP values of the ultrafiltration membrane 60 with applied voltage (0.8V, 1.0V, 1.2V) is significantly lower than the TMP value of the ultrafiltration membrane 60 without applied voltage. And the applied voltage (0.8V, 1.0V, 1.2V) can reduce membrane fouling by about 2.4, 2.08, and 2.43 times respectively. Referring to FIG. 14, FIG. 14 shows the change of the growth rate of the TMP value of the ultrafiltration membrane 60 under different voltage values. The growth rate of the TMP value of the ultrafiltration membrane 60 with applied voltage is reduced by half compared with the TMP value of the ultrafiltration membrane 60 without applied voltage. This is because an electrophoretic force generated by the applied electric field has a repelling effect on fouling, and the chemical action caused by the change of the solution can weaken the adsorption of serum proteins and humic acid.

Figure 15:
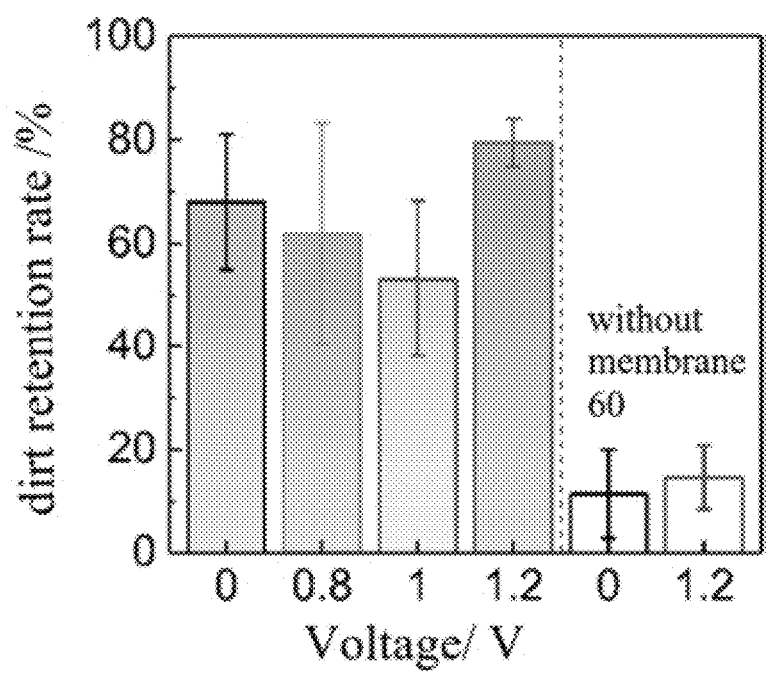
FIG. 15 is variation diagrams of dirt retention rate with and without ultrafiltration membrane.
Figure 16:
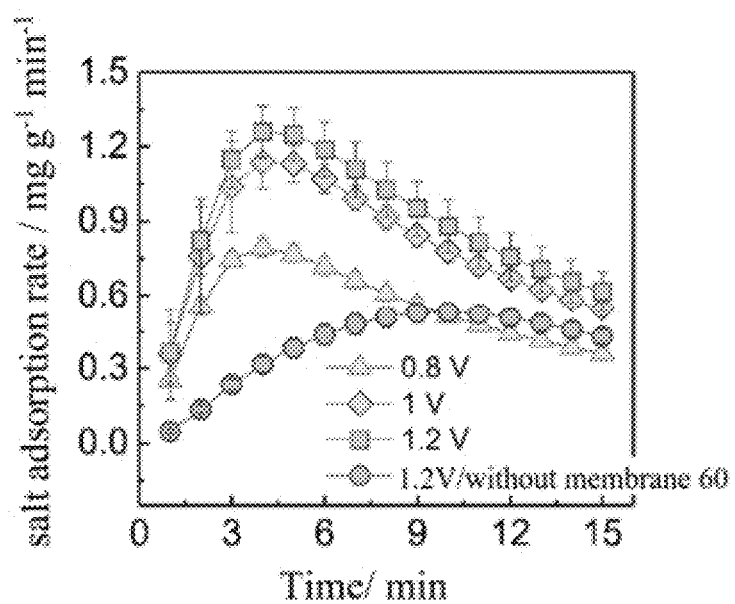
FIG. 16 is variation diagrams of SAR value with and without ultrafiltration membrane.

Furthermore, in order to study the antifouling ability of the carbon nanotube composite electrode 20, comparison tests without the ultrafiltration membrane 60 are respectively performed at 0V and 1.2V. Referring to FIG. 15, FIG. 15 shows the curves of dirt retention rate with and without the ultrafiltration membrane 60. Compared with the carbon nanotube composite electrode 20, the ultrafiltration membrane 60 plays a leading role in fouling retention. When there is no ultrafiltration membrane 60, the dirt retention rate can be slightly increased when the applied voltage is 1.2V, which shows that electric power has a positive effect on dirt retention. Referring to FIG. 16, FIG. 16 shows the curves of SAR values with and without the ultrafiltration membrane 60. The SAR value increases significantly and reaches the highest value earlier with the ultrafiltration membrane 60 compared to without ultrafiltration membranes. This is because when there is the ultrafiltration membrane 60, most of the dirties retained by the ultrafiltration membrane, but when there is no ultrafiltration membrane, the dirt is in direct contact with the electrode, and the dirt competes with the salt for adsorption sites. Therefore, the carbon nanotube composite electrode 20 can be used in conjunction with the ultrafiltration membrane 60 to achieve high-efficiency water purification efficiency.

The carbon nanotube composite electrode 20 of the capacitive deionization desalination device includes the carbon nanotube film structure and the composite carbon layer, wherein the orderly arrangement of the carbon nanotube film can act as a conductive chain to promote the overall connection of the composite carbon material and reduce the internal resistance of the electrode. Since the carbon nanotube film is a flexible and bendable material, the carbon nanotube composite electrode is also flexible and bendable. Therefore, the carbon nanotube composite electrode can be changed in shape as required.

Depending on the embodiment, certain of the steps of methods described may be removed, others may be added, and the sequence of steps may be altered. The description and the claims drawn to a method may comprise some indication in reference to certain steps. However, the indication used is only to be viewed for identification purposes and not as a suggestion for ordering the steps.

What is claimed is:

1. A capacitive deionization desalination device comprising:
   two carbon nanotube composite electrodes; and
   a mesh spacer between the two carbon nanotube composite electrodes;
   wherein each of the carbon nanotube composite electrodes comprises at least one carbon nanotube film structure and a composite carbon layer, the carbon nanotube film structure comprises at least two carbon nanotube films, the composite carbon layer comprises an activated carbon and a carbon black, the composite carbon layer is on the carbon nanotube film structure.

2. The capacitive deionization desalination device of claim 1, wherein the at least two carbon nanotube films are stacked with each other, each of the carbon nanotube films comprises a plurality of carbon nanotubes connected to each other by van der Waals force, the plurality of carbon nanotubes extend along a same direction.

3. The capacitive deionization desalination device of claim 1, wherein each of the carbon nanotube films comprises a plurality of carbon nanotube wires, the plurality of carbon nanotube wires are parallel with each other.

4. The capacitive deionization desalination device of claim 1, wherein the carbon nanotube film structure and the composite carbon layer are stacked with each other.

5. The capacitive deionization desalination device of claim 1, wherein the carbon nanotube film structure defines a first surface and a second surface, the composite carbon layer is on at least one of the first surface and the second surface of the carbon nanotube film structure.

6. The capacitive deionization desalination device of claim 1, wherein the composite carbon layer is between the two carbon nanotube films of the carbon nanotube film structure.

7. The capacitive deionization desalination device of claim 1, wherein the two carbon nanotube composite electrodes are parallel with each other.

8. The capacitive deionization desalination device of claim 1, wherein the two carbon nanotube composite electrodes are flat electrodes, folded surface electrodes or curved electrodes.

9. The capacitive deionization desalination device of claim 1, wherein each of the carbon nanotube composite electrodes further comprises a substrate, and the carbon nanotube film structure and the composite carbon layer are on the substrate.

10. The capacitive deionization desalination device of claim 1, wherein each of the carbon nanotube composite electrodes further comprises a plurality of carbon nanotube film structures and a plurality of composite carbon layers, and the plurality of carbon nanotube film structures and the plurality of composite carbon layers are stacked one by one, one of the plurality of composite carbon layers is between two adjacent carbon nanotube film structures, and one of the plurality of carbon nanotube film structures is between two adjacent composite carbon layers.

11. The capacitive deionization desalination device of claim 1, further comprises two ultrafiltration membranes configured to block organic particles in water.

12. The capacitive deionization desalination device of claim 11, wherein the two ultrafiltration membranes are between the two carbon nanotube composite electrodes, and the mesh spacer is between the two ultrafiltration membranes.

13. The capacitive deionization desalination device of claim 11, wherein each of the ultrafiltration membranes comprises a material selected from the group consisting of polyvinylidene fluoride, polytetrafluoroethylene, polysulfone, polyethersulfone, cellulose acetate, polyvinyl chloride, polyacrylonitrile, ceramic membrane and metal membrane.

* * * * *